S. MARTIN.
SUSPENDERS.
APPLICATION FILED OCT. 27, 1914.
Reissued June 22, 1915.
13,939.
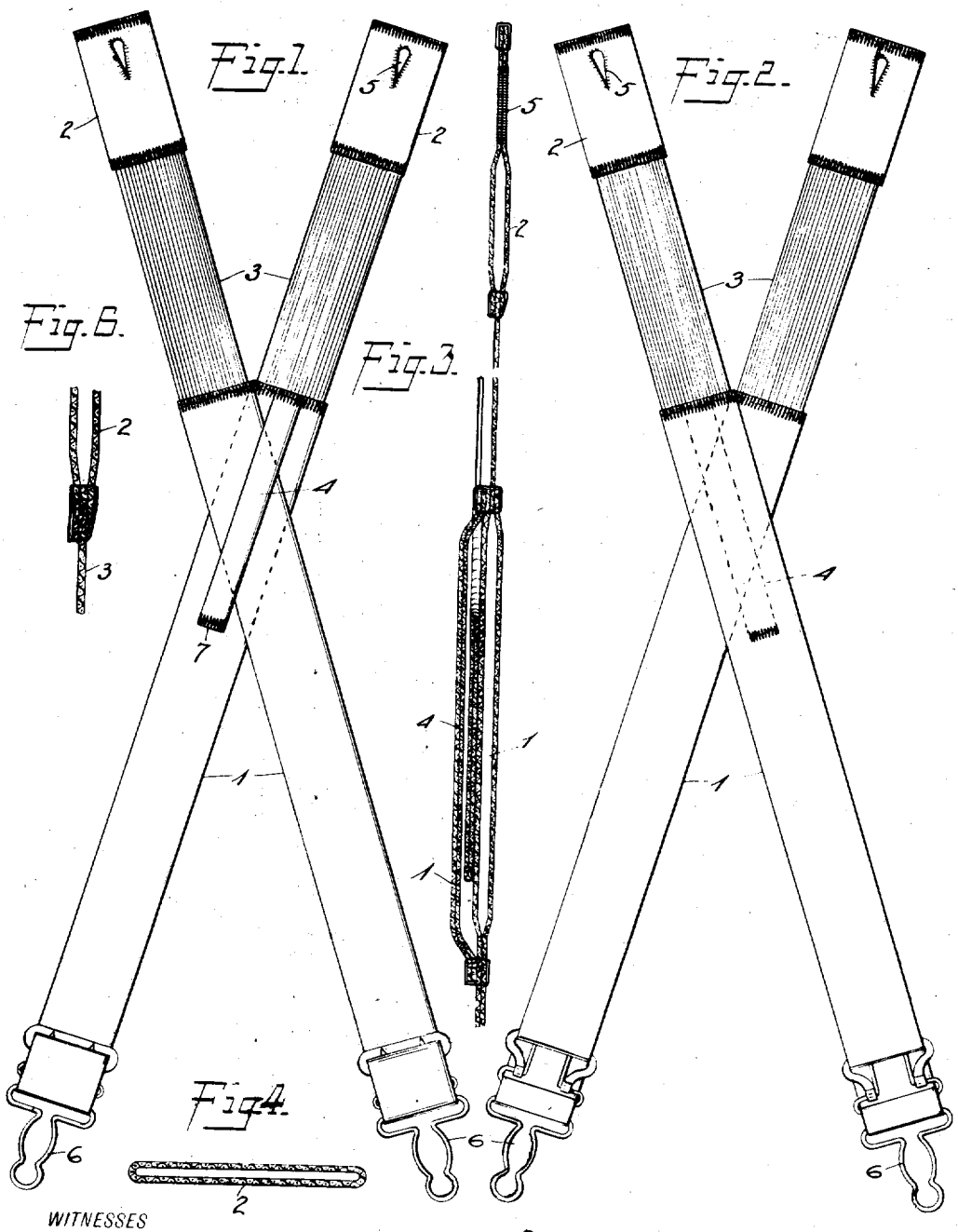
WITNESSES
George L. Blume
A. Bradway
INVENTOR
Sidney Martin
BY Munn & Co
ATTORNEYS

UNITED STATES PATENT OFFICE.

SIDNEY MARTIN, OF CLIFTONDALE, MASSACHUSETTS.

SUSPENDERS.

13,939. Specification of Reissued Letters Patent. Reissued June 22, 1915.

Original No. 1,042,939, dated October 29, 1912, Serial No. 654,360. Application for reissue filed October 27, 1914. Serial No. 868,914.

*To all whom it may concern:*

Be it known that I, SIDNEY MARTIN, a subject of the King of Great Britain, residing at Cliftondale, in the county of Essex and State of Massachusetts, have invented new and Improved Suspenders, of which the following is a full, clear, and exact description.

This invention relates to suspenders intended to be used by men engaged in severe manual labor, and has for its object the production of a simple and efficient means whereby elastic strips may be connected to the nonelastic portions of the suspenders without causing any roughened or enlarged places upon the body engaging faces of the suspenders.

In the accompanying drawings, wherein similar characters of reference indicate corresponding parts in all the views, Figure 1 is a plan view of the back of the suspenders; Fig. 2 is a plan view of the under side of the suspenders; Fig. 3 is a longitudinal section through the strap carrying the loop strap; Fig. 4 is a transverse section taken through one of the strips from which the suspenders are made showing the two sides flat or in their normal position; Fig. 5 is a transverse section through one of the straps showing the sides bulged to more clearly bring out the construction of the straps; Fig. 6 is an enlarged longitudinal sectional view taken through one of the straps showing how the elastic means are attached to the tubular straps.

The suspenders consist of two cross front straps 1 and rear tabs 2, which tabs are connected to the front straps 1 by means of elastic strips 3. One of the front straps 1 is provided near its rear end and upon its outer face with a loop-strap 4 which crosses the other front strap, as illustrated in Fig. 1, for holding the two members of the suspenders together. The rear tabs 2 are provided with button holes 5 for allowing the rear tabs to be connected to the rear of the trousers and the front straps carry at their forward ends button engaging clips 6 of any desired construction. The button holes 5 are barred or stitched zigzag across their edges so as to do away with the necessity of turning the edges under to form a smooth edge. The straps 1, as well as the tabs 2, are formed from a woven tubular cotton seamless web so as to do away with any rough places appearing upon the strips or tabs whereby the body of the wearer will be rubbed, as usually occurs with the ordinary suspenders wherein two strips are used to form the sections of the suspenders and are stitched along their edges. Elastic strips 3 as previously described are interposed between the front members 1 and the tabs 2, and have their ends placed between the side walls of the tubular portions out of which the straps and tabs are made. The end edges of the tabs 2 and straps 1 are barred or stitched zigzag so as to form a smooth surface along the end edges of the straps or tabs and also firmly hold the elastic in engagement with the ends of the straps 1 and tabs 2. By having the elastic strips attached to the tubular seamless webs as just described, it will not be necessary to turn the end edges of the seamless webs under to form neat edges and prevent the webs from unraveling, for the threads being zigzag or "barred," as it is commonly termed, will form an efficient binding or trimming for the edges of the seamless webs. The barring is so constructed as to cause the heaviest part of the stitching to appear upon the top of the suspenders thereby forming a substantially flush under face along the entire length of the suspenders. The end of the loop-strap 4 is secured to the front strap 1 by a row of barred stitching 7, in the same manner as described in connection with securing the straps to the elastic strips. The lower ends of the rear tabs 2 have their edges folded under slightly and are barred in the same manner.

The present invention is especially adapted to be used in connection with cheaply made suspenders preferably manufactured from the ordinary overall material, and by the construction of the suspenders in the manner as above specified not only a saving will be effected, but also an efficient suspender will be produced without having any parts which might rub upon the body and thereby cause chafing.

While the invention has been shown in connection with suspenders it is to be understood that articles other than suspenders can be made with the particular form of joint hereinafter claimed.

Having thus described my invention, I claim as new and desire to secure by Letters Patent:

1. A button tab formed of a tubular web, the outer end of said web having its edges turned in and stitched together with barred stitching, a strap inserted into the inner end of the tubular web and secured thereto with barred stitching, and a button hole formed by cutting through both plies of said tubular web and stitched around with barred stitching for preventing any rough places appearing upon the suspenders which would be likely to rub upon the wearer's body.

2. A joint of the class described comprising a tubular member, a member having its end extending longitudinally into the first member, and a row of bar stitching extending from one side edge of the tubular member to the other edge and crossing and covering the end edge of the tubular member, the stitching passing through the tubular member along a line substantially parallel with and inwardly from the end edge, and also through the second member along a line outwardly from and substantially parallel with the end edge of the tubular member.

3. A joint of the class described comprising a non-elastic tubular member open at one end, an elastic member having one end inserted in the open end of the tubular member, and a single row of stitches connecting the ends of the members together, and the stitches extending longitudinally of the members and covering the edges of the front and rear sides of the tubular member at the said open end thereof.

In testimony whereof I have signed my name to this specification in the presence of two subscribing witnesses.

SIDNEY MARTIN.

Witnesses:
MARCUS A. COHEN,
SARAH PINANSKY.